(12) United States Patent
Margulis

(10) Patent No.: US 7,041,717 B2
(45) Date of Patent: May 9, 2006

(54) COMPOSITION AND METHOD FOR SURFACE PROTECTION

(76) Inventor: Yuri Margulis, 9/18 Azmaut str.,City, Ashdod (IL) 77452

( * ) Notice: Subject to any disclaimer, the term of this patent is extended or adjusted under 35 U.S.C. 154(b) by 263 days.

(21) Appl. No.: 10/638,938

(22) Filed: Aug. 12, 2003

(65) Prior Publication Data

US 2004/0167254 A1    Aug. 26, 2004

(30) Foreign Application Priority Data

Feb. 24, 2003 (IL) .................................. 154592

(51) Int. Cl.
*C08L 95/00* (2006.01)
(52) U.S. Cl. .............................. 524/69; 524/68; 524/71; 524/705
(58) Field of Classification Search ................ 106/275, 106/284.01; 524/68–71, 427, 318, 705; 523/218
See application file for complete search history.

(56) References Cited

U.S. PATENT DOCUMENTS 5,284,887 A * 2/1994 Lavy et al. .................... 524/62

* cited by examiner

*Primary Examiner*—Peter Szekely
(74) *Attorney, Agent, or Firm*—Roach Brown McCarthy & Gruber, P.C.; Kevin D. McCarthy

(57) ABSTRACT

A composition and a method for protection of constructions and structures from chemical action and destructive environmental effects.

The main components of the composition are a polymerizing monomer, inert mineral filler, and chemical additives for improvement of chemical and physical properties.

The method includes preliminary energetic activation of 5% by weight of the whole composition mass, adding the activated part of the composition to its main mass, and application of the composition to the surface of material chosen from the group including concrete, asphalt concrete, metal, and wood to obtain the required surface protection.

20 Claims, 1 Drawing Sheet

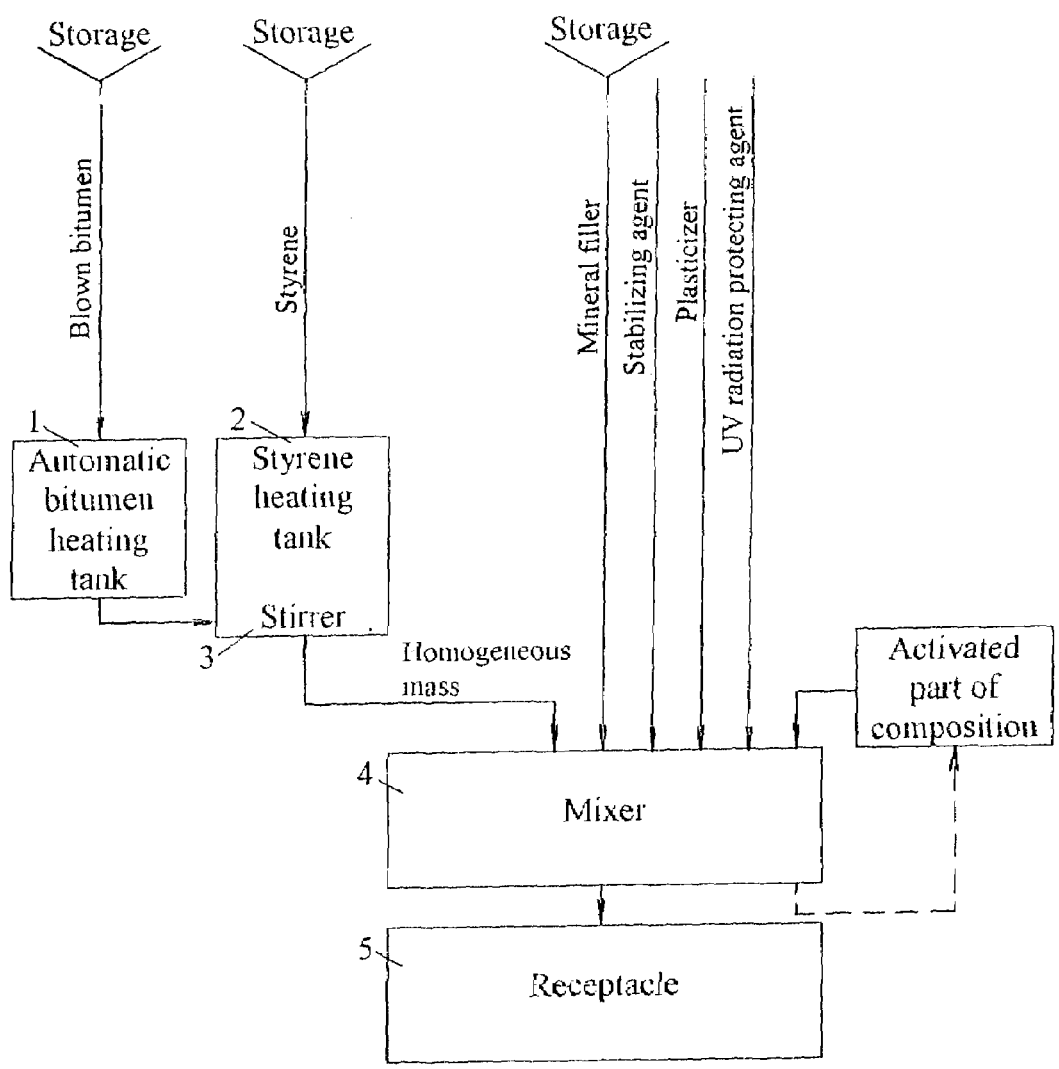

COMPOSITION AND METHOD FOR SURFACE PROTECTION

FIELD OF THE INVENTION

The invention relates to materials (compositions of high-molecular compounds) and methods of surface protection from chemical and environmental effects, or more exactly, to compositions of bituminous materials and methods of construction and structure surface protection using such compositions.

BACKGROUND OF THE INVENTION

The existing asphalt concrete compositions being used for paving and coating asphalt concrete roads, airfield runways, various asphalt concrete areas (such as storages, hangars, etc.) do not meet the necessary quality requirements. Environmental effects cause oxidation (aging) and loss of plasticity resulting in initiation of cracks and then in destruction of the pavement.

Studies in this field have been concentrated on optimizing the compositions now in use in an endeavor to obtain satisfactory protection from oxidation and mechanical wear.

Many compositions including various additives have been proposed (in particular, the compositions covered by U.S. Pat. No. 3,846,362 of 1974, US Cl. 524/66; U.S. Pat. No. 4,175,978 of 1979, US Cl. 524/68; U.S. Pat. No. 4,305,855 of 1981, US Cl. 524/62; U.S. Pat. No. 4,403,067 of 1983, US Cl. 524/71; U.S. Pat. No. 4,547,225 of 1985, US Cl. 524/71; and Japanese Patent No. 31341 of 1991).

However, the said compositions did not find wide application for coating the above mentioned areas because of poor quality results.

A later U.S. Pat. (No. 4,737,538 of 1988, US Cl. 524/71,. Int. Cl. C08L95/00) covers polymeric concrete compositions used for molding solids. The compositions contain thermosetting resin and a rubber component.

The cross-bond resins now in use are important for production of rigid solids (objects) but they are unsuitable as specific coatings of motor roads, airfield runways and other similar areas requiring essential flexibility and elasticity of coating compositions.

An important achievement in this field was the invention by Yuri Margulis and Avraham Lavy according to Israeli Patent No. 92917 of 1990, Int. Cl. C08L95/00, and analogous U.S. Pat. No. 5,284,887 published in 1994, US Cl. 524/71, 524/69, 524/68, 524/62, Int. Cl. C08L95/00 (the same inventors).

The compositions according to this invention are finding wider and wider practical use as a top protection layer applied to the asphalt concrete or similar underlying layer of motor roads, airfield runways and similar areas.

The layer of composition applied to the existing asphalt concrete surface penetrates the surface (underlying layer) to a depth of several millimeters, with penetration intensity gradually reducing with depth.

The obtained protection layer increases mechanical stability, reduces oxidation, resists to water penetration and imparts certain elasticity to the coating. The surface layer is resistant to ultraviolet radiation for a long time, and this property reduces aging and erosion of the surface.

Main components of the composition (percentages by weight):

| | |
|---|---|
| Monomer or monomer mixture chosen from methyl methacrylate, acrylate, styrene | 10 to 25 |
| Bitumen 75/25 | 15 to 25 |
| Comminuted mineral filler (milled marble, limestone, granite, dolomite, talc) | 50 to 80 |
| Ultraviolet radiation protecting and stabilizing agent (comminuted fly ash of about 300 mesh) | 0.1 to 0.8 |

An advantageous additive is oleic acid (1 to 3%) or dibutyl phthalate (as plasticizer).

As the composition is applied to a chosen surface, the monomer (or monomer mixture) polymerizes within a relatively short period of time, so that no curing agent is required.

The composition, in addition to its protective action, rejuvenates the aged asphalt concrete surface.

Quite recently methods and means have been found for essential improvement of properties of the above described composition (according to Israeli Patent No. 92917, U.S. Pat. No. 5,284,887 and their analogues) in compliance with the following new objectives:

widening the field of application (in particular, using the composition as a paint not freezing below −40° C., and also for protection of the surfaces of various constructions and structures made of concrete, asphalt concrete, metal, wood);

metal protection from corrosion;

acceleration and a greater depth of rejuvenation of asphalt concrete coatings applied to various constructions and structures;

the use of any type of blown bitumen, and not only bitumen 75/25.

SUMMARY OF THE INVENTION

The above mentioned objectives are attained by using the composition and the surface protection method being proposed for creating a protection layer on various concrete, asphalt concrete, metal and wooden surfaces.

One of versions of the composition being proposed consists of the following components (percentages by weight):

| | |
|---|---|
| Blown bitumen | 12 to 29 |
| Stabilizing agent | 0.1 to 3 |
| Ultraviolet (UV) radiation protecting agent, e.g., comminuted fly ash | 1 to 5 |
| Carboxylic, e.g., oleic acid as plasticizer | 0.5 to 5 |
| Styrene | 8 to 25 |
| Milled mineral filler (chosen, e.g., separately, from the group including dolomite, limestone, marble, quartzite, carbonate rocks) | 45 to 87 |

As used for protection of metal surface, the composition additionally contains 1 to 5% (by weight) more oleic acid as rust modifier.

To provide protection including the resistance to acids, the composition, instead of the above mineral fillers, contains the same percentage of milled quartz sand of 200 to 250 mesh.

For increased water resistance and water impermeability of the protection layer, the composition, instead of blown bitumen, contains 7 to 41% (by weight) of polystyrene, with all other components and percentages remaining unchanged.

A pigment (0.5 to 6% by weight) is added to the composition if it is to be used for painting building and structure facades in various colors.

To impart abrasion resistance to the protection layer to be applied to floors in industrial buildings, basalt, or andesite, or gabbro (50 to 85% by weight) is included in the composition as milled mineral filler, with all other components (with bitumen) and percentages remaining practically unchanged except the quantity of fly ash (2 to 4% by weight).

The purpose of stabilizing agent (stabilizer) is inhibition of the system coagulation and sedimentation, and also reducing the rate of thermo-oxidizing, light-induced and other types of aging. As stabilizer, a mixture of aromatic amine (a derivative of diphenyl amine and hydrogenated quinoline) is used together with a surfactant (saponin, gelatin, proteins, etc.).

For increased plasticity of the protection layer, the composition contains methyl methacrylate or acrylate monomer, or a combination (mixture) of the monomers (18 to 25% by weight), with all other components and percentages remaining unchanged.

The same composition may additionally contain styrene monomer mixed with methyl methacrylate and acrylate monomers (18 to 25% by weight).

For greater penetration into the material of asphalt concrete or wooden structure to be protected, the composition additionally contains kerosene (0.9 to 2% by weight).

The surface protection method also being proposed within the scope of this application for all versions of the composition developed by the inventor (and used to protect the above mentioned objects—constructions and structures made of concrete, asphalt concrete, metal, wood) includes the following stages:

preliminary energetic activation of a part of composition (about 5% by weight of its whole specified mass) by the method chosen from the group including ultrasound, electromagnetic and mechanical activation;

adding the above mentioned (activated) part of the specified quantity of composition to its main mass;

application of the composition to the chosen surface as a protection layer.

In this method, polymerization (hardening) occurs in the following sequence: at first the top (external) layer hardens and forms a water- and gas-impermeable membrane. At the same time, the material in the internal layers remains liquid. The applied material contains excess styrene monomer which begins to evaporate. However, the top membrane of the material is gas-impermeable. The resulting pressure created in the middle and lower layers of the material forces the active monomer molecules to penetrate into the asphalt concrete road pavement where they react with bitumen and form a bitumen copolymer having certain plastic properties. This rejuvenates the existing asphalt concrete pavement.

BRIEF DESCRIPTION OF THE DRAWINGS

In compliance with the commonly adopted requirements for description of an invention of a substance (composition), this description is illustrated by a drawing showing a block diagram of the process of composition production and preparing it for application to the surface to be protected.

DESCRIPTION OF THE PREFERRED EMBODIMENTS

The invention essence and potentialities are illustrated by the chosen characteristic versions (specific examples) of the composition intended for surface protection of various objects.

EXAMPLE 1

|  | % by weight |
|---|---|
| Blown bitumen | 17 |
| Stabilizing agent | 1 |
| UV radiation protecting agent (comminuted fly ash) | 2.5 |
| Oleic acid as plasticizer $[C_8H_{17}CH=CH(CH_2)_7COOH]$ | 1.5 |
| Styrene | 18 |

Comminuted mineral filler (milled dolomite of about 250 mesh) 60

Unlike the known similar compositions, this one does not contain any polymerization initiating agent.

The applied composition layer hardening time (usually ranging from 1 to 5 hours) is in inverse proportion to the ambient temperature and to the amount of energy imparted to the composition.

Composition application rate is 0.8 to 1.2 kg/m$^2$ of the surface being coated.

This composition is primarily intended for protection of asphalt concrete constructions. In principle, it is suitable for protection of concrete and wooden constructions as well, and if the oleic acid content is increased by, e.g., 1.5% (and the dolomite content is correspondingly decreased), it is also suitable for protection of metal constructions.

EXAMPLE 2

|  | % by weight |
|---|---|
| Blown bitumen | 17 |
| Stabilizing agent | 1 |
| UV radiation protecting agent (comminuted fly ash) | 2.5 |
| Oleic acid as plasticizer and rust modifier | 3.5 |
| Styrene | 18 |
| Milled mineral filler (comminuted dolomite of 250 mesh) | 58 |

The composition is essentially the same as in Example 1 but the oleic acid content is increased to 3.5% by weight, and this gives it a new property—the ability to protect metal from corrosion.

As a result of our studies, a novel and effective rust modifier has been obtained, based on a carboxyl nitrile containing polymer. The polymer forms an ionic bond with iron oxides and hydroxides. In our opinion, the nitrile groups cause an ion-dipole interaction with metal.

For the purpose of checking the protective properties of the material, metal samples were investigated with an electron microscope. The samples were weighed on an electronic balance accurate to within 0.01 g and placed in the Dead Sea water of 1.32 kg/liter density. It is known that chlorine ions are strong stimulators of corrosion. The samples were immersed into the water and dried in the open air at intervals of 14 days during two years. Under investigation were both external surfaces (after removal of the protective layer) and cross sections (side surfaces after cutting) of the samples. The investigation results did not reveal any additional traces of rust.

EXAMPLE 3

|  | % by weight |
|---|---|
| Blown bitumen | 17 |
| Stabilizing agent | 1 |
| UV radiation protecting agent (comminuted fly ash of 300 mesh) | 2.5 |
| Oleic acid as plasticizer | 1.5 |
| Styrene | 18 |
| Milled quartz sand (SiO$_2$, 250 mesh fineness) | 60 |

The composition is similar to that in Example 1 but comminuted (milled) quartz sand is used instead of dolomite.

The composition is primarily intended for surface protection from the action of acids.

EXAMPLE 4

|  | % by weight |
|---|---|
| Polystyrene | 12 |
| Stabilizing agent | 1 |
| UV radiation protecting agent (comminuted fly ash) | 3.5 |
| Oleic acid as plasticizer | 1.5 |
| Styrene | 18 |
| Milled mineral filler (quartzite, limestone, or marble) | 65 |

The composition is similar to that in Example 1 but polystyrene is used instead of blown bitumen, and milled quartzite, limestone, or marble is substituted for milled dolomite.

This composition of increased water resistance and water impermeability is essentially multipurpose and suitable for protection of concrete, asphalt concrete, metal and wooden surfaces/constructions.

Composition material application rate is 1 to 1.5 kg/m$^2$ of the surface being coated.

EXAMPLE 5

The composition is essentially the same as in Example 4 but kerosene (1% by weight) is added, and the mineral filler content is correspondingly decreased by 1%.

Adding kerosene increases penetration of the composition into the asphalt concrete or wooden surface to be protected.

EXAMPLE 6

|  | % by weight |
|---|---|
| Polystyrene | 12 |
| Stabilizing agent | 1 |
| UV radiation protecting agent (comminuted fly ash) | 2.5 |
| Oleic acid as plasticizer | 1.5 |
| Styrene | 17 |
| Methyl methacrylate monomer | 17 |
| Milled mineral filler | 49 |

The composition is close to that in Example 4 but is based on a 50%/50% monomer mixture of styrene (as in Example 4) and methyl methacrylate (a new additive).

Complete polymerization takes 20 minutes at 25° C.

After application to asphalt concrete surface (the main purpose), a protection layer of high plasticity and resistance is obtained.

The composition production process is as follows (see the drawing).

A special automatic bitumen heating tank 1 is used to prepare hot liquid blown bitumen while another tank 2 is used to heat to 50–60° C. the quantity of styrene monomer necessary for making a batch.

Then stirrer 3 is switched on, and the hot bitumen is fed by small portions into tank 2 holding the heated styrene.

After the prescribed quantity of hot liquid bitumen has been poured into tank 2, stirring goes on until a homogeneous mass is obtained.

After the homogeneous mass is obtained, the necessary quantity of mineral filler and other components of the mixture (composition) are added by small portions (with mixer 4 operating).

Then the ready mixture (composition) is fed into receptacle 5, and from there it is discharged into some transportation facilities and delivered for application to the chosen surface.

For the composition of increased water resistance and water impermeability, polystyrene is used instead of blown bitumen but the sequence of composition preparing operations remains unchanged.

The surface protection method is accomplished in strict compliance with the stages stated in Section "Summary of the Invention" of this description.

Some explanations for the surface protection method are given below.

After a part of composition (about 5% by weight of its total specified mass) undergoes energetic activation, this activated part is added to the main mass of composition material, the material is applied to the chosen surface, and polymerization of the whole composition mass begins causing in this case a high-rate increase in strength, at first in the external layer, and then in the bulk.

A strong water- and gas-impermeable membrane is formed on the top (external) layer of the applied composition while its middle and lower (internal) layers so far remain liquid. The applied material contains excess monomer (in particular, styrene) which begins to evaporate. However, the top membrane is gas-impermeable. As a result, a pressure similar to osmotic pressure is created in the middle and lower layers of the applied material.

Due to the internal pressure, the active molecules of monomer (styrene is assumed as above) penetrate, e.g., the asphalt concrete road pavement to be protected, react with bitumen (in this version) and form a bitumen copolymer having certain plastic properties, i.e., the existing (in this case, asphalt concrete) layer is rejuvenated.

(Experimental tests have shown that rejuvenation depth reaches 100 mm, i.e., it practically embraces the most important working layer of road pavement).

Eventually, the applied material hardens completely, and then it performs its second function: it protects (in the version under consideration) the asphalt concrete road pavement from oxidation, ultraviolet radiation and water penetration into the bulk of construction.

As a result, a complex treatment of the road occurs: rejuvenation and protection from environmental effects.

Such an approach (method) prolongs the service life of, in particular, asphalt concrete motor roads to a period of up to 15 years.

The above mentioned energetic activation of a part of the composition is based on activation of molecules, i.e., on imparting them the energy sufficient to overcome the potential barrier separating the initial and final states of system (composition).

The activation energy characterizing the initiation of polymerization is usually close to energy of the bond splitting with the initiating agent decomposition. For most initiating agents, the values are within 20 to 40 kCal/mol. For this reason, rather high initiating rates can be reached at temperatures above 30° C. At higher temperatures, polymerization can be started without introducing special chemical initiating agents into the system. In this case, radicals are generated due to decomposition of small amounts of peroxides forming in interaction between the monomer and air oxygen, especially when the monomer molecules collide vigorously. This phenomenon was found by us in radical polymerization of styrene only.

In this case, polymerization is a chain reaction where development of kinetic chain is accompanied by the growth of macromolecule material chain in the following kinetically bound stages:

Initiation: conversion of a small portion of monomer into active centers under the action of ultrasonic energy. The polystyrene dissolved in the monomer generates additional active centers.

Chain growth: attachment of the monomer molecules to the active centers.

The method of ultrasound activation allows in this case obtaining a complex rejuvenation of the bitumen component of asphalt concrete pavement:

by gaseous treatment of bitumen with active styrene molecules;

by using a liquid rejuvenator based on oleic acid.

To sum up all the foregoing, it is expedient to emphasize the following:

The approach being proposed in this application provides a deep (up to 100 mm) penetration of active molecules of monomer (active gas/styrene vapor) into the bulk of construction to be protected leading to rejuvenation of, in particular, asphalt concrete roads and areas to the corresponding depth (as compared with several millimeters in previous Israeli Patent No. 92917 and U.S. Pat. No. 5,284,887 which may be considered as presenting a prototype approach).

According to the approach being proposed, accelerated polymerization and hardening of the composition having been applied to the chosen object are achieved by the material activation which is a fundamental and very essential novelty of this surface protection method developed specially for the composition being proposed and its versions (as compared with the use of toxic phenol in the prototype approach; in the approach being proposed, no phenol is used).

The composition being proposed is a new and effective rust modifier.

The composition being proposed allows adding a certain quantity of pigments intended to obtain a layer of strong and stable paint on the facades of buildings/structures.

The composition being proposed allows construction/structure insulation work to be done at negative temperatures (the composition hardens and does not freeze at temperatures down to −45° C.).

Thus, in addition to the novelty as compared with the composition in the above mentioned Israeli Patent No. 92917 and U.S. Pat. No. 5,284,887 (the prototype), the composition being proposed herein, due to its specific ranges of component percentages, is featured by essential differences from and essential advantages over the said prototype (non-obvious to an expert in this field), both in itself and in combination with the new surface protection method developed by the inventor.

The invention claimed is:

1. A composition intended for protection of a surface of material selected from the group consisting of concrete, asphalt concrete, metal, and wood, wherein said composition comprises from about 12 to about 29% by weight blown bitumen; from about 0.1 to about 3% by weight stabilizing agent; from about 1 to about 5% by weight comminuted fly ash ultraviolet radiation protecting agent; from about 0.5 to about 5% by weight carboxylic acid, from about 8 to about 25% by weight styrene monomer, or between about 18 to about 25% by weight methyl methacrylate or acrylate monomers or a mixture thereof, or a mixture of styrene and methyl methacrylate and/or acrylate monomers; and from about 45 to about 87% by weight milled mineral filler.

2. A composition according to claim 1, wherein said carboxylic acid is oleic acid that operates as rust modifier, said composition is intended for protection of metal surfaces.

3. A composition according to claim 1, wherein said mineral milled filler is milled quartz sand of from about 200 to about 250 mesh fineness, wherein said composition is of high acid resistance.

4. A composition of increased water resistance and water impermeability intended for protection of a surface of material selected from the group consisting of concrete, asphalt concrete, metal, and wood, wherein said composition comprises from about 7 to about 41% by weight polystyrene, from about 0.1 to about 3% by weight stabilizing agent, from about 1 to about 5% by weight comminuted fly ash ultraviolet radiation protecting agent, from about 0.5 to about 5% by weight carboxylic acid, from about 8 to about 25% by weight styrene monomer, from about 45 to about 87% by weight milled mineral filler selected from the group consisting of dolomite, limestone, marble, quartzite, and carbonate rocks.

5. A composition according to claim 4, further comprising a pigment in an amount from about 0.5 to about 6% by weight, said composition is intended for painting the facades of buildings and structures in various colors.

6. A composition according to claim 1, wherein said mineral milled filler is in an amount from about 50 to about 85% by weight and is selected from the group consisting of basalt, andesite, and gabbro, said composition is of high abrasion resistance intended for protection of industrial building floors made of material selected from the group consisting of concrete, asphalt concrete, metal, and wood.

7. A composition according to claim 1, comprising from about 18 to about 25% by weight of methyl methacrylate, acrylate monomers, or a mixture thereof, wherein said composition has increased plasticity.

8. A composition according to claim 7, further comprising styrene monomer mixed with methyl methacrylate and acrylate monomers in an amount from about 18 to about 25% by weight.

9. A composition according to claim 1, further comprising kerosene in an amount from about 0.9 to about 2% by weight, said composition is intended for protection of asphalt, concrete or wooden surfaces and provides a greater penetration of the composition into the material surface to be protected.

10. A surface protection method using a composition comprising from about 12 to about 29% by weight blown bitumen; from about 0.1 to about 3% by weight stabilizing agent; from about 1 to about 5% by weight comminuted fly ash ultraviolet radiation protecting agent; from about 0.5 to about 5% by weight carboxylic acid; from about 8 to about 25% by weight styrene monomer, or from about 18 to about 25% by weight methyl methacrylate or acrylate monomers or a mixture thereof, or a mixture of styrene and methyl methacrylate and/or acrylate monomers; and from about 45 to about 87% by weight milled mineral filler, said method comprising the stages of:

preliminary energetic activation of about 5% by weight of the composition whole specified mass by the method selected from the group consisting of ultrasound, electromagnetic and mechanical activation;

adding the above mentioned part of the composition to its main mass;

application of the composition to the surface to be protected; so that sequential polymerization of the composition occurs beginning with formation of a water- and gas-impermeable membrane on the external layer of composition coating the surface to be protected while the material in its internal layer remains liquid and styrene monomer (whose quantity is excessive) evaporates under the said membrane causing a pressure which forces the active monomer molecules to penetrate into the existing concrete pavement where they react with bitumen and form a bitumen copolymer having plastic properties and thereby rejuvenating the existing concrete structure.

11. A surface protection method according to claim 10, wherein said composition further comprises kerosene in an amount from about 0.9 to about 2% by weight, said kerosene provides greater penetration of the composition into the material of surface to be protected.

12. A surface protection method according to claim 10, wherein said mineral milled filler is selected from the group consisting of dolomite, limestone, marble, quartzite, and carbonate rocks.

13. A surface protection method according to claim 10, wherein said mineral milled filler is selected from the group consisting of basalt, andesite, and gabbro.

14. A surface protection method according to claim 10, wherein said blown bitumen is replaced with polystyrene, said polystyrene is in an amount of about 7 to about 41% by weight of the composition.

15. A composition according to claim 1, wherein said mineral milled filler is selected from the group consisting of dolomite, limestone, marble, quartzite, and carbonate rocks.

16. A composition according to claim 1, wherein the depth of penetration of said composition into a surface of material to be protected is from about 50 to about 60 mm, said material is selected from the group consisting of concrete, asphalt concrete, metal, and wood, wherein said composition essentially completely rejuvenates said material.

17. A composition according to claim 16, wherein said composition further comprises kerosene in an amount from about 0.9 to about 2% by weight, said kerosene provides greater penetration of the composition into the material of surface to be protected.

18. The composition according to claim 4, wherein said carboxylic acid is oleic acid.

19. The composition according to claim 10, wherein said carboxylic acid is oleic acid.

20. The composition according to claim 10, wherein said existing concrete pavement is asphalt pavement.

* * * * *